Figure 1:
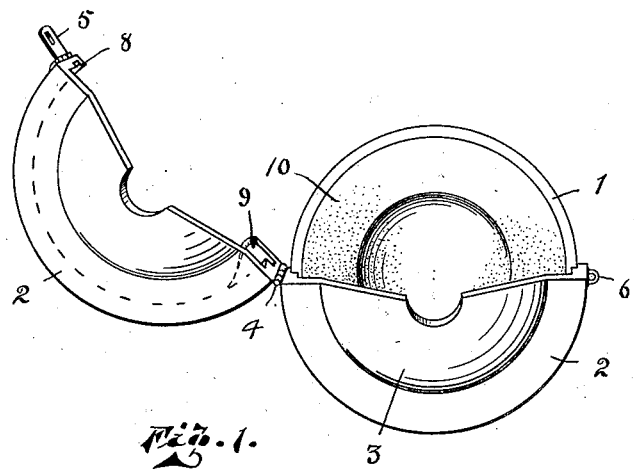

P. McGUIRE.
STEERING WHEEL LOCK FOR AUTOMOBILES.
APPLICATION FILED JUNE 7, 1919.

1,329,913. Patented Feb. 3, 1920.

Inventor
Patrick McGuire.
By Geo. Stevens.
Attorney.

UNITED STATES PATENT OFFICE.

PATRICK McGUIRE, OF SUPERIOR, WISCONSIN.

STEERING-WHEEL LOCK FOR AUTOMOBILES.

1,329,913.   Specification of Letters Patent.   Patented Feb. 3, 1920.

Application filed June 7, 1919. Serial No. 302,522.

*To all whom it may concern:*

Be it known that I, PATRICK McGUIRE, a citizen of the United States, residing at Superior, in the county of Douglas and State of Wisconsin, have invented certain new and useful Improvements in Steering-Wheel Locks for Automobiles, of which the following is a specification, reference being had therein to the accompanying drawing.

This invention relates to locking devices for automobiles and has special reference to an attachment conveniently applicable to the steering wheel of an automobile whereby the controlling levers thereof may be safely housed against interference by unauthorized persons, the steering wheel also being incased within the same housing.

The principal object is to produce a simple detachable device which may be conveniently carried within the vehicle.

Other objects and advantages of the peculiar construction will appear in the further description thereof.

Figure 2:
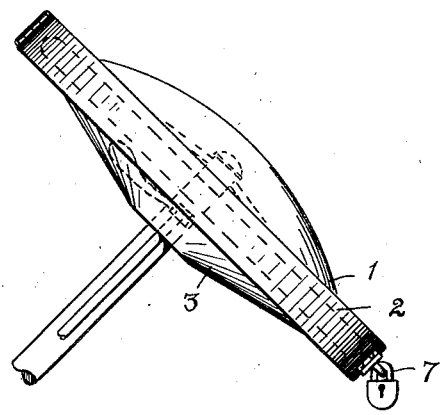

In the accompanying drawings forming part of this application and in which like reference characters designate like parts:

Figure 1 is a plan view of the underside of the locking device shown in an open position, and Fig. 2 is a side elevation of the device as applied to the steering wheel of an automobile.

1 represents a thin substantially concavo-convex disk having rigidly attached, in any desired manner, to one-half thereof, one-half of a somewhat similarly-shaped portion 2, with a truncated cone-shaped central portion 3. The opposite half of the portion 2 is hingedly attached, as at 4, to the half which is rigidly fixed to the disk 1 and may be opened or closed as desired, the two halves being held together by any form of suitable hasp and staple 5 and 6, secured with a lock, as at 7. The movable half of the portion 2 overlaps the edge of the disk 1, it having a groove, indicated at 8, therein for such purpose and the flange about said groove, adjacent the hinge 4, is considerably extended inwardly, forming a projection 9 which acts as a guide in bringing the movable half in the position about the disk, which materially assists in the quick and ready closing of the housing about the automobile wheel.

I have illustrated, at 10, a lining, such as felt, or the like, which may be provided upon the inner faces of both opposite halves of the housing, to prevent scratching or marring in any way the steering wheel, as well as making a soft and pleasing article to apply to the wheel. The entire housing may be constructed of light metal, such as aluminum, or the like as desired.

While I have described a specific form of structure in the embodiment here shown, it is to be understood that various modifications within the scope of the claims may be resorted to without departing from the spirit of the invention.

Having thus described my invention, what I claim as new and desire to secure by Letters Patent, is:

1. A steering wheel locking device of the character described comprising in combination, a solid disk, a second disk spaced therefrom, one-half of which is rigidly fixed about its circumferential edge to the first mentioned disk and the other half being hingedly attached to the fixed half, a circumferential flange carried by the hinged half which, when engaging the disk, will overlap the edge of same, and an extension of said flange adjacent the hinge, that will first engage the edge of the disk and act as a guide to the succeeding portion of the flange, substantially as described.

2. A steering wheel locking device of the character described, comprising in combination a substantially concavo-convex disk, one half of a similarly-shaped disk securely fixed to the first mentioned disk and the other half of the second mentioned disk being hinged to the fixed half and coöperatively engageable therewith and with the first mentioned disk, substantially as and for the purpose described.

3. A steering wheel locking device of the character described, comprising, in combination, a disk, a second disk spaced therefrom, one-half of which is rigidly fixed about its circumferential edge to the first mentioned disk and the other half being hingedly attached to the fixed half, and a circumferential flange carried by the hinged half which, when engaging the disk, will overlap same, substantially as described.

In testimony whereof I have hereunto affixed my signature in the presence of two witnesses.

PATRICK McGUIRE.

Witnesses:
C. M. OUELLETTE,
S. GEO. STEVENS.